United States Patent
McHale et al.

(10) Patent No.: US 6,395,143 B1
(45) Date of Patent: *May 28, 2002

(54) BIOSORPTION SYSTEM

(75) Inventors: Anthony McHale; Mark Bustard, both of Portstewart (GB)

(73) Assignee: University of Ulster, Coleraine (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,815

(22) PCT Filed: Dec. 15, 1997

(86) PCT No.: PCT/GB97/03441

§ 371 (c)(1),
(2), (4) Date: Aug. 18, 1999

(87) PCT Pub. No.: WO98/26851

PCT Pub. Date: Jun. 25, 1998

(30) Foreign Application Priority Data

Dec. 14, 1996 (GB) .............................................. 9626018

(51) Int. Cl.$^7$ .............................................. B01D 61/42
(52) U.S. Cl. ...................... 204/164; 204/551; 204/554; 204/640; 204/647; 204/1
(58) Field of Search ................ 204/543, 551, 204/554, 640, 647, 164

(56) References Cited

U.S. PATENT DOCUMENTS

| | | | |
|---|---|---|---|
| 3,827,961 A | 8/1974 | Doniat et al. ................ | 204/180 |
| 3,969,215 A | 7/1976 | Zievers ........................ | 204/276 |
| 4,292,408 A | 9/1981 | Zimmermann et al. ..... | 435/173 |
| 5,324,491 A | 6/1994 | Lovley ......................... | 423/11 |
| 5,405,509 A * | 4/1995 | Lomasney et al. .......... | 205/742 |
| 5,443,706 A * | 8/1995 | Kuroda et al. ............... | 204/242 |

FOREIGN PATENT DOCUMENTS

| | | |
|---|---|---|
| FR | 2 106 286 | 4/1972 |
| GB | 1 367 318 | 9/1974 |
| WO | 91/01392 | 7/1991 |

OTHER PUBLICATIONS

Chemical Abstracts, vol. 108, No. 4, Jan. 25, 1988, Gardea–Torresdey, Bioaccumulation and Measurement of copper at an Alga–Modified Carbon Paste Electrode, p. 615, col. 2, XP002060371.

Chemical Abstracts, vol. 109, No. 24, Dec. 12, 1988, Gardea–Torresdey, Bioaccumalation and Voltammetric Behavior of Gold at Alga–Containing cardon Paste Electrode, p. 469, col I, XP002060372.

Drake et al., "Plant–Derived Materials for Metal Ion–Selective Binding and Preconcentration", Analytical Chemistry, vol. 68, No. 1, Jan. 1, 1996, pp. 22A–27A.

* cited by examiner

Primary Examiner—Arun S. Phasge
(74) Attorney, Agent, or Firm—Ratner & Prestia

(57) ABSTRACT

The invention relates to a system, process and apparatus for separating biosorbent and sorbate. Biomass enclosed within a membrane system is coupled to an electrode, which is capable of being placed in contact with the sorbate containing material in the presence of a counter electrode. An electric field may be discharged across the electrodes and ionic species will migrate into the membrane enclosed system. The migrated species within the membrane can be taken up and processed by the biosorbtive processes of the biomass. The system may be used to remove dye stuffs, metal, heavy metals, radionuclides and other pollutants from natural and artificial sources.

12 Claims, 4 Drawing Sheets

BIOSORPTION SYSTEM

This application is the U.S. national phase application of PCT International Application No. PCT/GB97/03441 filed Dec. 15, 1997.

This invention relates to biosorption processes for removal and recovery of heavy metals, radionuclides, pollutants and other materials from the environment.

The existence of heavy metals and radionuclides and pollutants such as dye stuffs in the environment represent a long-term environmental hazard (Gadd and White [1993] Trends in Biotechnol., 11, 353). In many cases, when these materials are introduced into the environment they are taken up by biological systems including plant and microbial materials. It has been proposed that this phenomenon, known as biosorption, might be exploited in biotechnological processes relating to metal removal/recovery from mining wastes, domestic and industrial wastes and removal of radionuclide contaminants present in waste waters from the nuclear industry (McHale & McHale, [1994] Biotechnol. Advances, 12, 647).

Although biosorption results in the uptake of metals and radionuclides by microorganisms, no single mechanism responsible for uptake has been identified. The term "adsorption" suggests binding of a material to the surface of an adsorbent. The term "absorption" implies penetration of the sorbate through the surface to an inner matrix. Since the uptake of metals/radionuclides and other agents by microbes appears to involve both types of process, the term "biosorption" is most commonly applied to describe the phenomenon.

In any previously proposed bioremediation systems concerned with exploiting biosorptive processes, one of the major problems encountered has been the efficient separation of the biosorbent material from the relevant waste water stream, particularly if large volumes are to be processed. In many cases workers in the field have suggested the use of immobilization systems in order to facilitate re-use of the biosorbent material. It has also been proposed that this would also facilitate efficient separation from the relevant waste-water stream and aid in the regeneration of the biosorbent (McHale & McHale [1994] (Biotechnol Advances), 12, 647).

In addition to the above complications associated with the exploitation of biosorptive processes, solutions of metals/radionuclides and other pollutants in waste-water streams tend to be very dilute. Since biosorptive processes, particularly using non-living biomass are in many cases equilibrium events, the inventors have found that uptake of the relevant sorbate is usually enhanced by positively disturbing those equilibria. They postulate that increasing the concentration of the sorbate in the vicinity of the biosorbent may tend to increase the degree of uptake exhibited by any form of biomass.

Distribution of ions across a semipermeable membrane is also an equilibrium event. However, removal of free or soluble ions from solution within a membrane enclosed compartment tends to unbalance that equilibrium and the net flow of ions into the membrane enclosed space. The inventors suggest that placing biosorbent material inside a membrane-enclosed compartment and exposing this to an external solution of ions would result in a net flow of those ions into the enclosed space. In effect this would achieve ion removal from the external solution by a mechanism known as non-equilibrium dialysis. It has the added advantage of ensuring biosorbent and sorbate separation before, during and after the ion removal/recovery process.

Although this offers many advantages over conventional biosorption processes, this type of system would be highly dependant on the rate of diffusion into the inner compartment. It has previously been shown however that it is possible to attract ions into membrane-enclosed compartments using an electric field and this is referred to a electrodialysis (Bobrinskaya et al., [1995] Russian J. Applied Chem. 68, 1205; Ishimaru [1994] Desalination, 98, 485.). It has been suggested that this may be exploited in processes such as desalination of water although it is worth noting that removal of the applied electric field in conventional electrodialysis modalities, results in leakage of the relevant ions from the membrane-enclosed space.

It is one object of the present invention to provide a system to remove and/or recover heavy metals/metals/ionic species/radionuclides and/or pollutants in general from the environment.

According to the present invention there is provided a system for separating biosorbent and sorbate, the system comprising biomass enclosed within a membrane system coupled to an electrode capable of being placed in contact with sorbate containing material in the presence of a counter electrode such that an electric field may be discharged across the electrodes and ionic species will migrate into the membrane enclosed system.

Accordingly in one aspect the invention provides a biosorption process comprising exposing sorbate containing material to biomass enclosed within a membrane system and generating an electric field across the membrane thereby causing sorbate to migrate to the biomass.

In another aspect the invention provides biosorption apparatus comprising biomass enclosed within a membrane system coupled to or capable of being coupled to an electrode.

In another aspect the invention relates to the use of immobilised biomass in a system, apparatus or process as described herein.

The biomass material may be living or non-living, modified or non-modified, free or immobilised or any combination of these forms.

In a particular embodiment the biomass is distillery biomass.

In the system the migrated species within the membrane can be taken up and processed by the biosorptive processes of the biomass.

The electric field in the system may be generated in a conventional manner and/or from renewable energy sources including solar, wind and wave energy forms.

Suitably the system may be used to remove metals/heavy metals/radionuclides and/or other pollutants from natural and artificial sources and/or combinations thereof.

In one embodiment the invention provides an apparatus comprising modified non-living biomass enclosed within a membrane system coupled to a platinum electrode.

Alternatively the biomass may be non-living.

The electrode may be of any other electrode material.

The apparatus may be placed in contact with the sorbate-containing material in the present of a counter electrode. An electric field will be discharged across the electrodes and the ionic species will migrate into the membrane enclosed system. The migrated species within the membrane enclosed space will then be taken up by the biosorptive processes exhibited by the biomass.

The living or non-living biomass may be modified.

The living or non-living biomass may be immobilised.

In the embodiment described above the electric filed may be generated in the conventional manner and/or from renewable energy resources including, although not exclusively, solar, wind and wave energy forms.

In another embodiment the invention provides a device (or derivative thereof) based on the use of electrodiffusion-assisted biosorption and capable of removing metals/heavy metals/radionuclides/and/or other pollutants from natural and artificial sources and/or combinations thereof) for the purposes of bioremediation and/or substance recovery.

The device (or derivative thereof) based on the use of electrodiffusion-assisted biosorption may be capable of concentrating agents for analytical purposes.

In a third embodiment the invention provides a system capable of generation of ionic species and subsequent sequestration of these by the systems described herein.

The embodiments of the invention may be operated in batch, fed-batch and/or continuous modes including combinations thereof.

The embodiments of the invention may be operated in conjunction with other processes.

The invention will comprise any of the above systems and/or combinations of the above.

BRIEF DESCRIPTION OF THE DRAWINGS

The invention will be described with reference to the following examples and the accompanying drawings wherein.

EXAMPLE 1

Figure 1:
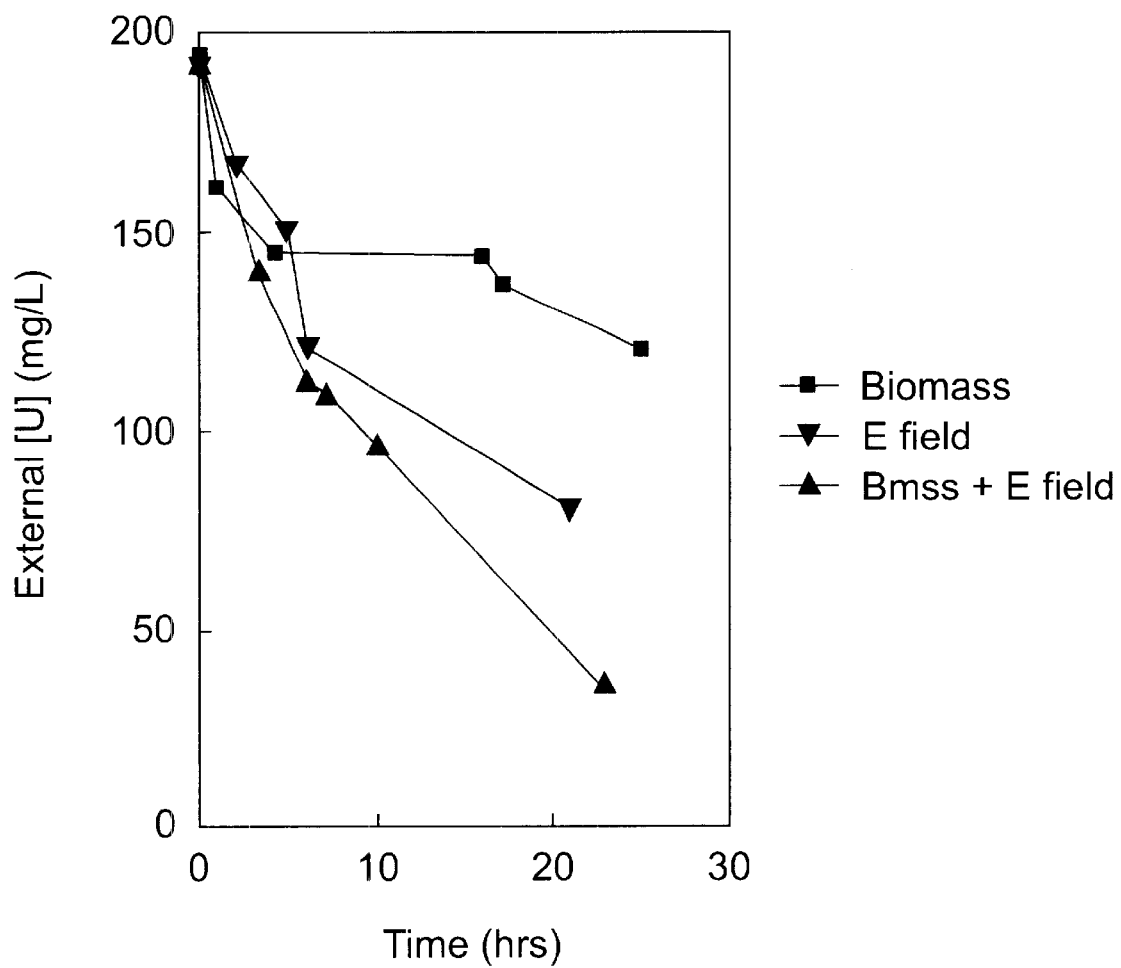
FIG. 1 illustrates the sequestration of uranium at relatively high concentrations using the electrodiffusion-assisted biosorption system/process.

Removal of relatively high concentrations of uranium from solution using electrodiffusion-assisted biosorption:

In these studies waste biomass was obtained from industrial processes concerned with alcohol production for the beverage industry. The biomass was washed by centrifugation at 10,000 xg for 20 min. and subsequently freeze dried. In the experiments described here 1 g (dry weight) biomass was resuspended in 10 ml of distilled water. This was then placed in dialysis tubing (Visking tubing) which was closed at one end. The membrane-enclosed system was fixed in place in a beaker containing 500 ml of 1 mM uranyl acetate. A platinum wire electrode (negative in this case) was placed inside the open end of the dialysis tubing which was vented to the air. The other electrode was placed in the external solution. The electrodes were connected to a power pack which was set to deliver a constant voltage of 20 V (it should be noted that the proposed devices and/or systems described herein will not be restricted with respect to delivered electric parameters or electric field strengths). Samples from the external solution were harvested at various times and the concentration of uranium was determined using the method described by Savvin ([1961], Talanta, 8, 673). In these experiments control systems consisted of either biomass inside the dialysis membrane without an applied electric field and using the dialysis membrane without biomass but with an applied electric field. The results obtained from these experiments are shown in FIG. 1. In the control consisting of the biomass and no applied electric field (■) the external concentration of uranium decreased from 195 mg/L to 119 mg/L over a 25 hour period (FIG. 1). In the control involving the use of the electric field in the absence of biomass (▼) the external uranium concentration decreased from 190 mg/L to 79 mg/L over a 21 hour period. In the test system consisting of the biomass and electrodiffusion-assisted transfer of uranium into the enclosed compartment (▲), the external uranium concentration decreased from 195 mg/L to 33 mg/L over a 23 hour period. This demonstrated that 162 mg of uranium had concentrated within the 10 ml volume inside the dialysis tubing. It is also worth noting that at each time point the external concentration of uranium in the electrodiffusion system containing the biomass was lower than that in the system without the biomass, hence our use of the term "electrodiffusion-assisted biosorption".

EXAMPLE 2

Figure 2:
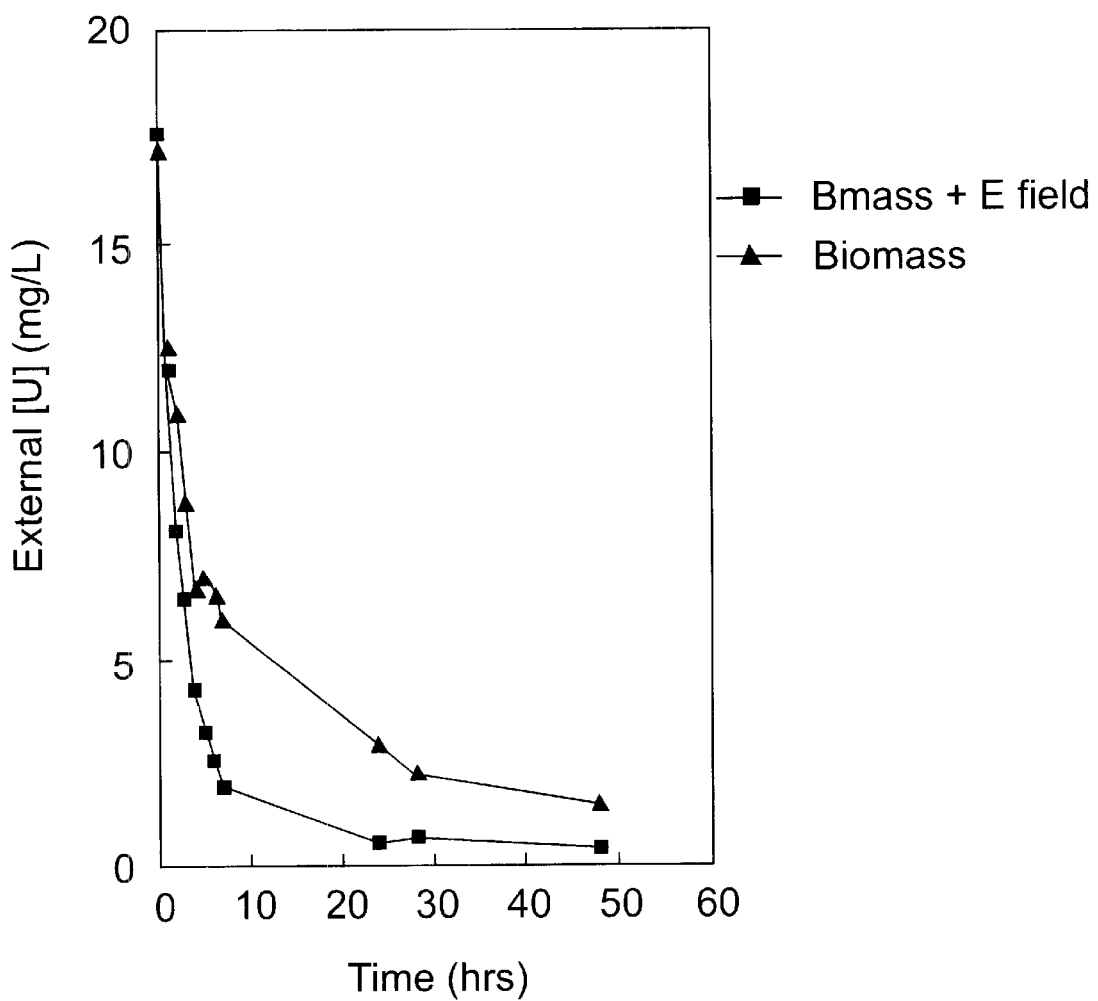
FIG. 2 illustrates removal of uranium (at relatively low concentrations) for solution using the electrodiffusion-assisted biosorption system/process.

Removal of relatively ow concentrations of uranium from solution using the electrodiffusion-assisted biosorption system:

The experimental configuration described for Example 1 was similar in these experiments except that the external concentration of uranium was adjusted from 1 mM to 0.074 mM. In addition 0.5 g of biomass was suspended in 5 ml of distilled water and this was placed inside the dialysis tubing. This was then inserted into a beaker containing 250 ml of the uranium solution. In this case the control consisted of biomass but in the absence of applied electric field. The results are shown in FIG. 2. In the control system (▲) the concentration of uranium decreased from 17.4 mg/L to 2.86 mg/L within 24 hours and to 1.42 mg/L within 48 hours. In the test system (■) however the concentration of uranium decreased from 17.6 mg/L to 0.5 mg/L in 24 hours and to 0.3 mg/L within 48 hours. It should be noted that the figure of 0.3 mg/L for the concentration of uranium is outside the lower confidence limits of the assay used to detect uranium.

EXAMPLE 3

Figure 3:
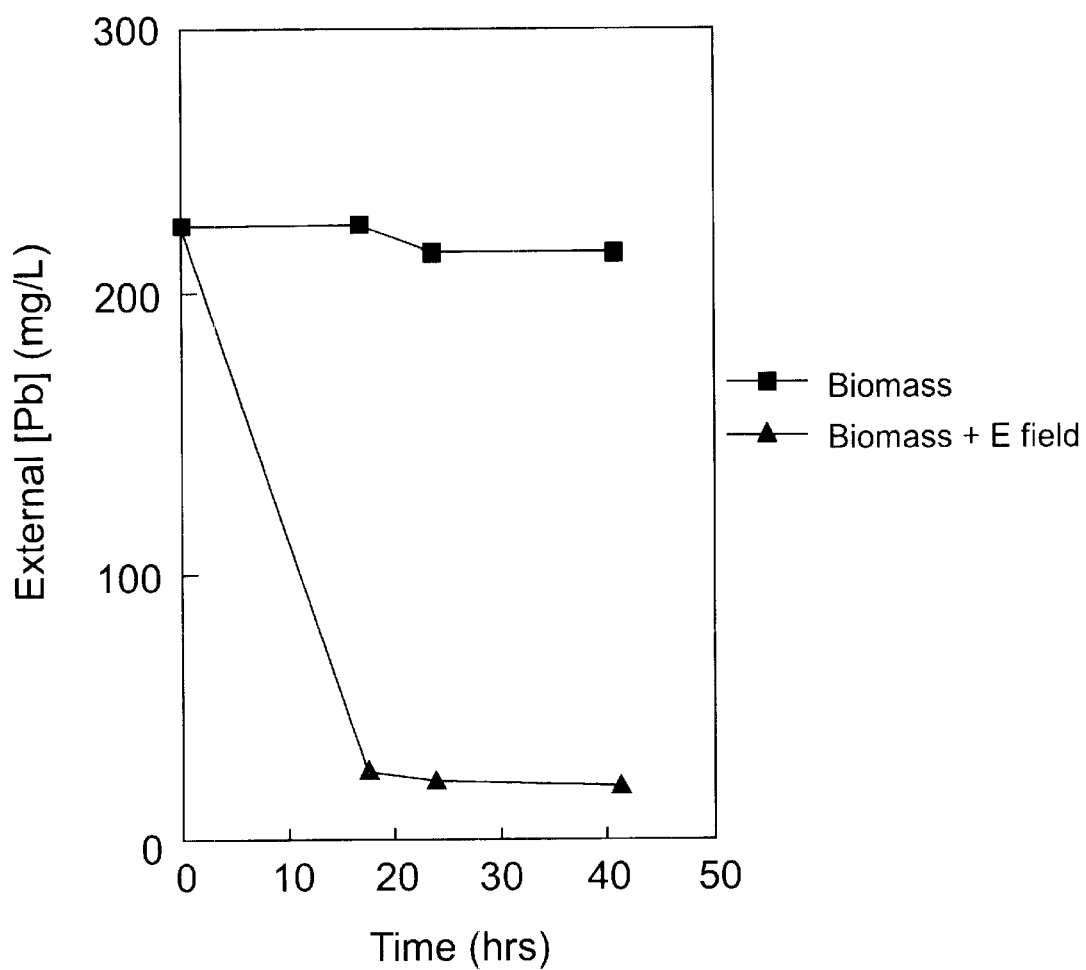
FIG. 3 illustrates removal of lead from solution using the electrodiffusion-assisted biosorption system/process.

Removal of lead from solution using the electrodiffusion-assisted biosorption system:

In this part of the study a similar configuration to that used in Example 2 above was used except that the uranium solution was replaced with lead nitrate at a concentration of 230 mg/L. In addition the concentration of lead was determined using atomic absorption spectrophotometry. The control consisted of biomass within the membrane-enclosed compartment and no electric field was applied. The results are shown in FIG. 3. In the control system (■) the external concentration of lead decreased to a concentration of 216.7 mg/L after 41 hours. In the test system (▲) the external concentration of lead decreased to 18.7 mg/L indicating a 91.9% overall decrease in external concentrations.

EXAMPLE 4

Figure 4:
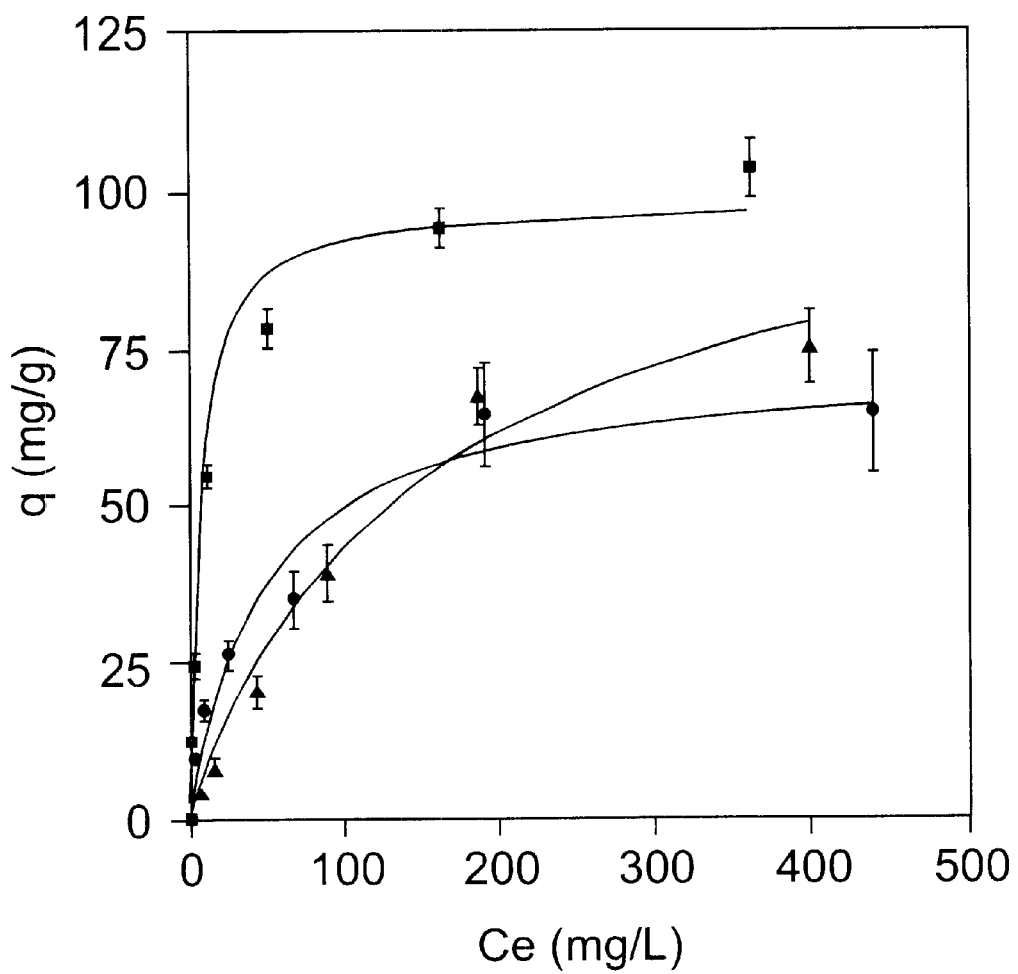
FIG. 4 illustrates biosorption of Remazol red, golden yellow and black B dyes by 1 g/L distillery biomass.

Biosorption of textile dyes by distillery-derived biomass:

The objective of this part of the study was to demonstrate that the distillery-derived biomass was capable of textile dye biosorption. In fulfilling this objective it was decided to employ commonly used textile dyes including Remazol red, golden yellow and Remazol black B. Solutions of dye were prepared in distilled water and used as the sorbate. The concentrations of the Remazol red, Remazol golden yellow and the Remazol black B were measured spectrophotometrically at 520, 410 and 600 nm, respectively. Biomass was placed in contact with the dye solution in 10 ml contact reactions and those reactions were allowed to continue for a period of 12 hours. The biomass was then removed (by either centrifugation or membrane filtration [0.2 μm filtration units]) and the residual concentration of dye (Ce mg/L) remaining in solution was determined using a spectrophotometer. From those values the amount of dye associated with the biomass q (mg/g dry weight biomass) was determined and the data were used to construct biosorption isotherms. The results are shown in FIG. 4 which is a graph of q(mg/g) vs Ce(mg/L). The error bars represent S.E.M, n=6. This experiment demonstrates that the biomass is capable of binding significant quantities of dye. From the data presented maximum biosorption capacities ($q_{max}$ mg/g dry weight biomass) of 97, 107 and 62 mg/g were obtained for the Remazol red, Remazol golden yellow and Remazol black B, respectively.

EXAMPLE 5

Electrodiffusion assisted treatment of a textile dye containing effluent from William Clark & Sons Limited, a local textile processing plant: in Upperlands, Maghera, Co Londonderry.

One objective in this part of the study was to determine whether or not the electrodiffusion assisted system might provide a novel and alternative means of treating and decolorising textile dye containing effluent. In order to do this, it was decided to obtain a sample of effluent from a local textile processing plant, William Clark & Sons Limited, Upperlands, Maghera, Co Londonderry. Raw effluent was obtained from a holding tank outlet at the plant. It had a murky blue green appearance and contained a significant quantity of particulate material. This effluent was placed in the membrane-excluded space of the electrodiffusion apparatus as described in Example 1 for the metal-bearing solutions. The normal electrode configuration involved placing the negative electrode in the membrane-enclosed space together with the biomass. The positive electrode was placed in the effluent which was in the membrane-excluded space. The system was operated under the same conditions described in Example 1 for a period of 12–24 hours. Results from a typical run are summarized in Table 1. Parameters such as suspended solids, the degree of decolorisation and removal of COD were measured before and after treatment.

TABLE 1

Treatment of textile processing effluent using the electrodiffusion-assited biosorption system

| Parameter measured | Before | After |
|---|---|---|
| Suspended Solids (mg/L) | 50–55 | 0–0.6 |
| Decolorisation (%) | 0 | 96–98 |
| Control 1* | 0 | 33.9 |

TABLE 1-continued

Treatment of textile processing effluent using the electrodiffusion-assited biosorption system

| Parameter measured | Before | After |
|---|---|---|
| Control 2* | 0 | 34.6 |
| COD (mg/L) | 171 | 89 |

Control 1 for the decolorisation experiments consisted of the system using only the electrodes and excluding the biomass from the system whereas Control 2 consisted of the biomass without the application of an electric field.

Suspended solid content was measured using dry weight analysis in combination with filtration though Whatman grade I filter paper. In the untreated material the suspended solids were determined to be in the region of 50–55 mg/L and this was reduced to 0.6 mg/L within a 12 hour period. In this case it appeared the evolution of gas from the positive electrode in the membrane-excluded space resulted in floatation of particulate material and this could be recovered by skimming from the top of the treated solution. This also resulted in a significant degree of decolorisation. In studying decolorisation it was found that the effluents had a $\lambda_{max}$ at 600 nm and therefore spectrophotometry could be used to examine this parameter. It was found that the system was capable of removing 96–98% of the colour from the effluent and it should be stated that the liquid in the membrane-excluded compartment was colourless to the naked eye. In measuring the chemical oxygen demand (COD) of the treated and untreated effluent a commercial kit was used (Hach Europe Ltd., Belgium). It was found that almost 50% of the OD of the untreated effluents could be removed using the system. The results demonstrate that the electrodiffusion system is capable of very effective treatment of textile processing effluents, particularly with respect to decolorisation.

In summary, the examples described herein demonstrate the ability of the invention to significantly reduce concentrations of a variety of pollutants and other materials in the environment.

The invention is not limited to the embodiments described above which may clearly be modified and/or varied without departing from the scope of the invention.

What is claimed is:

1. A system for separating biosorbent and sorbate: the system comprising non-living biomass enclosed within a membrane system coupled to an electrode capable of being placed in contact with sorbate containing material in the presence of a counter electrode such that an electric field may be discharged across the electrodes and ionic species will migrate into the membrane enclosed system.

2. A system as claimed in claim 1 wherein the non-living biomass material is modified or non-modified, immobilized or non-immobilised or any combination of these forms.

3. A system as claimed in claim 1 or claim 2, wherein the electric field in the system is generated from conventional energy sources and/or from renewable sources including solar, wind and wave energy forms.

4. A system for separating biosorbent and sorbate as claimed in claim 1 or 4, wherein the system is operated in batch, batch-fed and/or continuous mode including combinations thereof.

5. Immobilised non-living biomass for use in biosorption in a system as claimed in claim 1.

6. A biosorption process comprising the steps of exposing sorbate containing material to non-living biomass enclosed within a membrane and generating an electric field in the sorbate containing material in the vicinity of the membrane thereby causing sorbate to migrate to the biomass.

7. A process as claimed in claim 6 wherein the biomass material is non-living, modified or non-modified, immobilised or non-immobilised, or any combination of these forms.

8. A process as claimed in claim 6 or 7 wherein the electric field in the system is generated from conventional energy sources and/or from renewable sources including solar, wind and wave energy forms.

9. A process as claimed in claim 6 wherein the non-living biomass is immobilised.

10. A biosorption apparatus comprising non-living biomass enclosed within a membrane coupled to an electrode.

11. An apparatus as claimed in claim 10 wherein the biomass material is non-living, modified or non-modified, immobilised or non-immobilised or any combination of these forms.

12. A process for separating biosorbents and sorbate to allow the removal of metals, heavy metals, radionuclides and/or other pollutants from natural and artificial sources and/or combinations thereof, comprising the steps of enclosing a non-living biomass within a membrane, coupling this to an electrode, placing the electrode in contact with said sources in the presence of a counter electrode, and discharging an electrical field across the electrodes, this effecting the migration of the ionic species into the membrane enclosed system.

* * * * *